(12) United States Patent
Cardolle

(10) Patent No.: US 7,806,464 B2
(45) Date of Patent: Oct. 5, 2010

(54) FAIRING FOR A TRAILER

(75) Inventor: Francis Cardolle, Montréal (CA)

(73) Assignee: Francis Cardolle, Montreal, Quebec (CA)

( * ) Notice: Subject to any disclaimer, the term of this patent is extended or adjusted under 35 U.S.C. 154(b) by 0 days.

(21) Appl. No.: 11/694,317

(22) Filed: Mar. 30, 2007

(65) Prior Publication Data

US 2008/0238139 A1    Oct. 2, 2008

(51) Int. Cl.
B62D 35/00        (2006.01)
(52) U.S. Cl. .................................. 296/180.4; 296/180.1
(58) Field of Classification Search ............. 296/180.1, 296/180.2, 180.4, 181.5, 198; 280/407.1, 280/154, 160, 847–849, 851, 854
See application file for complete search history.

(56) References Cited

U.S. PATENT DOCUMENTS

| 2,104,182 | A |   | 1/1938  | Best |
| 2,605,119 | A | * | 7/1952  | Earnest ....................... 280/849 |
| 3,869,617 | A | * | 3/1975  | Gaussoin et al. ............ 280/851 |
| 4,174,653 | A |   | 11/1979 | Appelblatt |
| 4,262,953 | A | * | 4/1981  | McErlane ................. 296/180.4 |
| 4,421,354 | A | * | 12/1983 | Lemaster .................. 296/180.2 |
| 4,486,046 | A | * | 12/1984 | Whitney et al. ........... 296/180.4 |
| 4,611,847 | A | * | 9/1986  | Sullivan .................... 296/180.2 |
| 4,640,541 | A | * | 2/1987  | FitzGerald et al. ........ 296/180.1 |
| 4,746,160 | A | * | 5/1988  | Wiesemeyer ............. 296/180.2 |
| 4,991,906 | A |   | 2/1991  | Fingerle |
| 5,280,990 | A | * | 1/1994  | Rinard ..................... 296/180.1 |
| 5,538,315 | A | * | 7/1996  | Dixon ...................... 296/180.4 |
| D395,848  | S |   | 7/1998  | Meryman et al. |
| 5,788,321 | A |   | 8/1998  | McHorse et al. |
| 5,921,617 | A | * | 7/1999  | Loewen et al. ........... 296/180.4 |
| 6,109,639 | A | * | 8/2000  | Blassingame et al. .... 280/414.1 |
| 6,361,061 | B1 | * | 3/2002  | Lea .......................... 280/414.1 |
| 6,644,720 | B2 | * | 11/2003 | Long et al. ............... 296/180.4 |
| 6,685,256 | B1 | * | 2/2004  | Shermer ................... 296/180.4 |
| 6,974,178 | B2 | * | 12/2005 | Ortega et al. ............. 296/180.1 |
| 7,093,889 | B2 | * | 8/2006  | Graham .................... 296/180.4 |
| D531,948  | S  |   | 11/2006 | Angelo et al. |
| 7,163,258 | B2 | * | 1/2007  | Dyer et al. ................... 296/191 |
| 2001/0013693 | A1 | * | 8/2001  | Ross et al. ............... 280/407.1 |
| 2001/0033095 | A1 | * | 10/2001 | Scott .......................... 296/198 |
| 2004/0080185 | A1 | * | 4/2004  | Loddo ........................ 296/198 |
| 2005/0051991 | A1 | * | 3/2005  | Saxon et al. ............. 280/149.2 |
| 2005/0116508 | A1 | * | 6/2005  | Sebastian ................... 296/198 |
| 2006/0157952 | A1 |   | 7/2006  | Bonnaud et al. |
| 2006/0181048 | A1 | * | 8/2006  | Stowell et al. ........... 280/149.2 |

(Continued)

FOREIGN PATENT DOCUMENTS

EP          0121641        10/1984

(Continued)

Primary Examiner—Glenn Dayoan
Assistant Examiner—Gregory Blankenship
(74) Attorney, Agent, or Firm—Bereskin & Parr

(57) ABSTRACT

The present invention relates to a fairing for a trailer having a wheel assembly adapted to be movably attached to the trailer. The fairing is positioned to cover a frontal area of the wheel assembly. More specifically, the fairing includes a shell and an anchoring mechanism. The shell is designed to cover the frontal part of the wheel assembly. The anchoring mechanism allows attaching the shell to the wheel assembly so that the shell is adapted to freely follow a movement of the wheel assembly upon repositioning of the wheel assembly relative to the trailer.

10 Claims, 10 Drawing Sheets

U.S. PATENT DOCUMENTS

| | | | | |
|---|---|---|---|---|
| 2006/0214474 | A1* | 9/2006 | Omiya et al. | 296/198 |
| 2007/0120397 | A1* | 5/2007 | Layfield et al. | 296/180.4 |
| 2008/0296930 | A1* | 12/2008 | Roush et al. | 296/180.4 |
| 2010/0117396 | A1* | 5/2010 | Dayton | 296/180.1 |

FOREIGN PATENT DOCUMENTS

| | | |
|---|---|---|
| EP | 1190937 | 3/2002 |
| SU | 1650510 | 5/1991 |

* cited by examiner

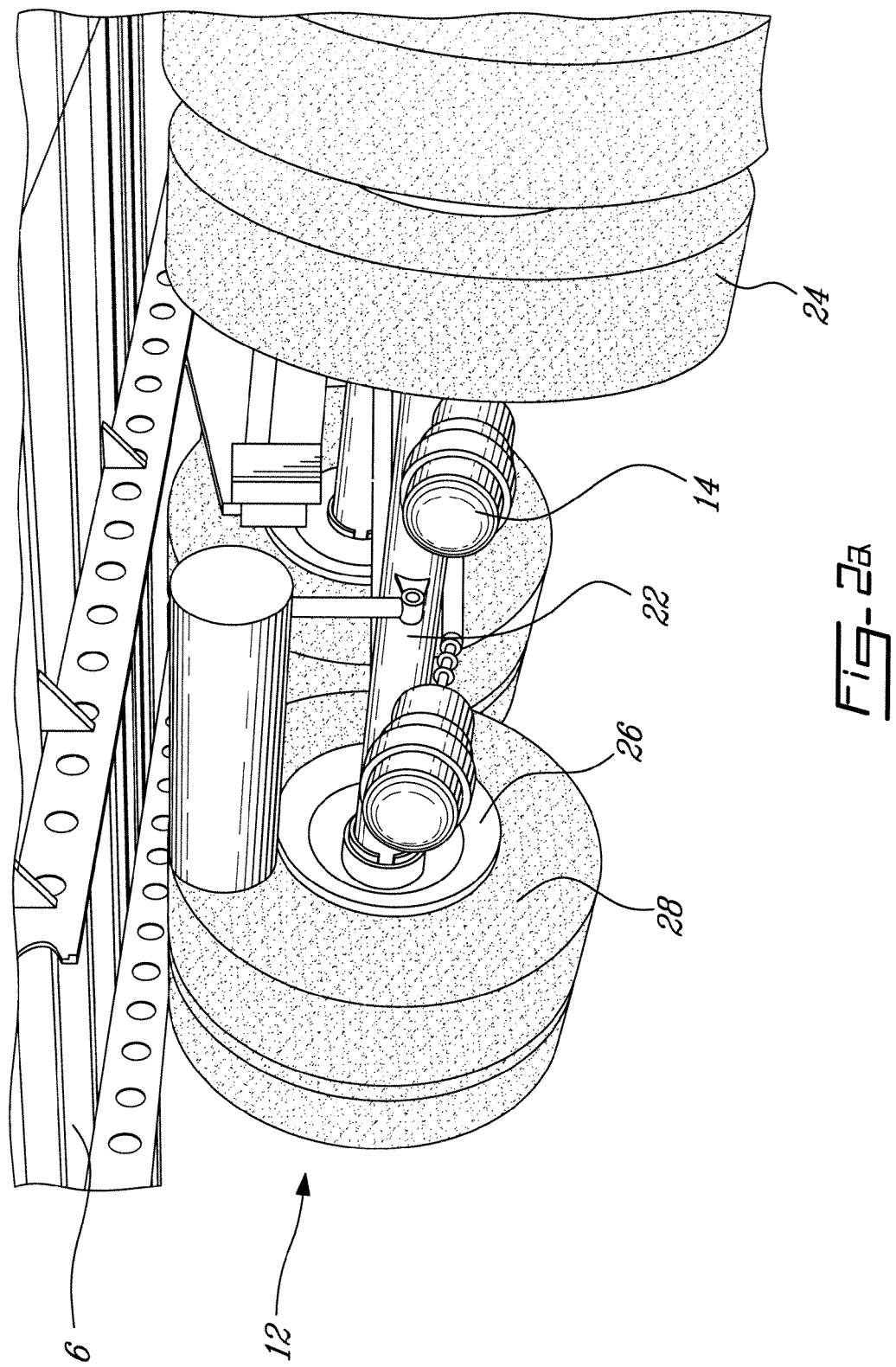

FAIRING FOR A TRAILER

FIELD OF THE INVENTION

The present invention generally relates to the field of trailers. More specifically, the invention relates to a fairing for a trailer.

BACKGROUND OF THE INVENTION

In recent years, many changes have been noticed in the way goods are transported. Railway transportation has been decreasing and road transportation is on the increase. As road transportation is increasing, high levels of carbon emission have been registered. The high level of carbon emission is becoming a growing concern, as it is known to contribute to the green house effect subjected to the planet. This growing concern has encouraged many people to find ways to reduce their vehicle's fuel consumption. Furthermore, as people and businesses are always trying to reduce cost, the drive to reduce fuel consumption is all the more increasing. The concern of fuel consumption is even greater when motorized vehicles are pulling trailers as many trailers lack in aerodynamic design.

Many have in the past thought of ways to increase the aerodynamics of trailers particularly for semi-trailers. The following solutions increase the aerodynamics of semi-trailers, such as found in the U.S. Pat. No. 5,921,617, titled: "Longitudinally and Vertically Adjustable Trailer Underbody Fairing" and the U.S. Pat. No. 6,644,720, titled: "Adjustable Trailer Underbody Fairing". Both solutions consist of side panel fairings that are placed on the underbody of a dual axle trailer closing off laterally the large gap between the trailer wheels of each axle. By placing such a fairing on the underbody of a dual axle trailer, the amount of air that would normally catch in the wheels and other extruding surfaces under the trailer is reduced, thus increasing the aerodynamics of the trailer and reducing the fuel consumption of the pulling vehicle. Although these previous inventions do serve the purpose of reducing fuel consumption, they do have downfalls.

The downfalls include reduction of clearance of the trailer between the axles. Firstly, in both previously stated solutions, the fairing is mounted, under the trailer, on the full length between the trailer wheels of each axle. When maneuvering over a ramp and on uneven terrain, the fairing must be either lifted up or removed, as the terrain might interfere with the fairing. To avoid damage, the driver must in this case stop his vehicle and step out of his vehicle to either lift or remove the fairing. This procedure can be arduous and quite cumbersome.

Secondly as the fairing is mounted, under the trailer, on the full length between the trailer wheels of each axle, the access to the underbody is difficult. The accessibility to the underbody of the trailer is important as regular verification and maintenance of the underbody is necessary for safety reasons and the proper upkeep of the trailer. Furthermore, the accessibility is also necessary to allow the deployment of a trailer-jack.

Hence, a solution that reduces fuel consumption of vehicles that pull trailers while giving clearance between the axles of the trailer, and allowing access to the underbody of the trailer would be advantageous.

SUMMARY OF THE INVENTION

The present invention relates to a fairing for a trailer. More precisely, the fairing is adapted for anchoring to an underside of the trailer in front of a wheel assembly. The fairing, when installed, helps to counteract effects of the environment on the trailer while in motion.

The fairing includes a shell and an anchoring mechanism. The shell is designed to cover a frontal part of the wheel assembly. The anchoring mechanism allows attaching the shell to the wheel assembly.

In accordance with some aspects of the invention, the fairing may increase the aerodynamics of the trailer. Furthermore, the fairing may protect components included in the wheel assembly. Additionally, the fairing might prevent side splashes from the wheel assembly to hit overtaking vehicles or bystanders.

BRIEF DESCRIPTION OF DRAWINGS

These and other features of the present invention will become more apparent from the following description in which reference is made to the appended drawings wherein:

FIG. 2a is an underside view of one of the trailers in FIG. 1;

DETAILED DESCRIPTION OF THE INVENTION

The present solution relates to a fairing for a trailer. More precisely, the fairing is installed to an underside of the trailer, spanning across a front of a trailer's wheel assembly. As the fairing is placed in front of the trailer's wheel assembly, the fairing can protect not only the wheel assembly but can also protect, the brake boosters from the environment. Furthermore, the shape of the fairing can also reduce side splashes, thus possibly increasing the security level for surrounding vehicles. And last but not least, the fairing is shaped to divert an airflow engulfed under the trailer thus possibly improving aerodynamics of the trailer. Contrary to its prior art, as the fairing covers only a limited portion of an underside of the trailer, the present solution can allow greater access for maintenance, to the underside of the trailer. Additionally, when maneuvering the trailer over difficult terrain the fairing might not require to be removed.

Figure 1:
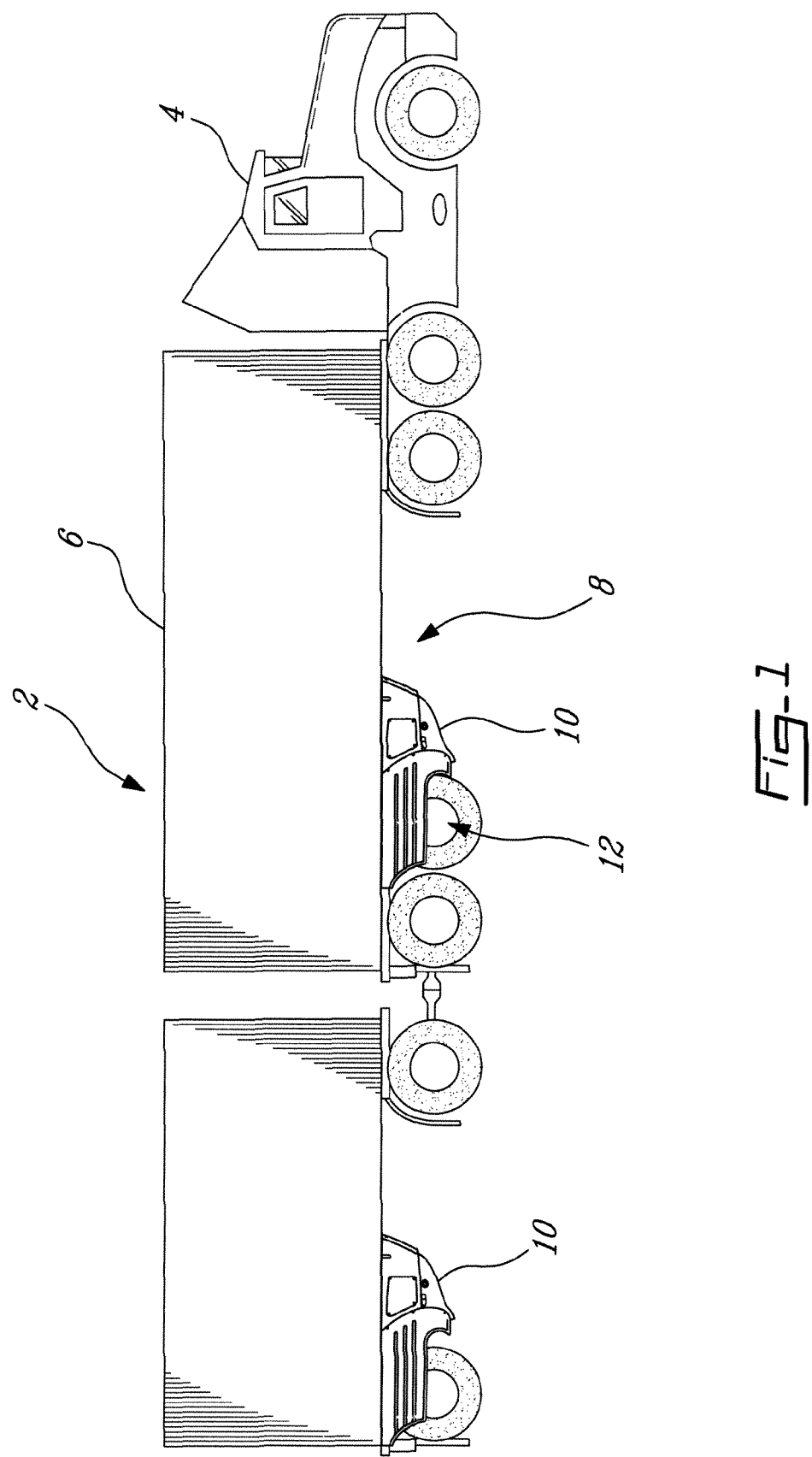
FIG. 1 is a perspective view of a tractor pulling two trailers to which a fairing is installed on the underside, in accordance with an embodiment of the invention.

Presented in FIG. 1 is a powered vehicle 4 depicted as pulling two trailers 6. Those skilled in the art will recognize the combination of the powered vehicle 4, such as a tractor, pulling a single or multiple trailers 6 as being a semi-trailer 2. However, it is important to specify that throughout the present description, the word "trailer" 6 is used to incorporate any non-powered vehicle that is pulled by the powered vehicle 4. All categories of trailers are being considered, ranging from freight trailers and utility trailers that are used to transport cargo, goods and materials, to travel trailers that are meant to house people while camping. Furthermore, just as a train can be made of wagons that are pulled by a locomotive, multiple trailers can be hitched to one another and pulled by the powered vehicle 4.

Conventionally, as the trailer 6 is being pulled, the airflow engulfs in an underside 8 of the trailer 6. Consequently, due to the presence of a wheel assembly 12, the airflow engulfed in the underside 8 of the trailer 6 cannot move freely and might limit the forward movement of the trailer 6. Just as the airflow engulfs in the underside 8 of the trailer 6, elements of the environment such as dirt, rain, snow, ice, etc. might also accumulate in the underside 8 of the trailer 6. The accumulation of such elements of the environment might affect break boosters 14, if included in the wheel-assembly 12 as presented in FIG. 2a.

Figure 2B:
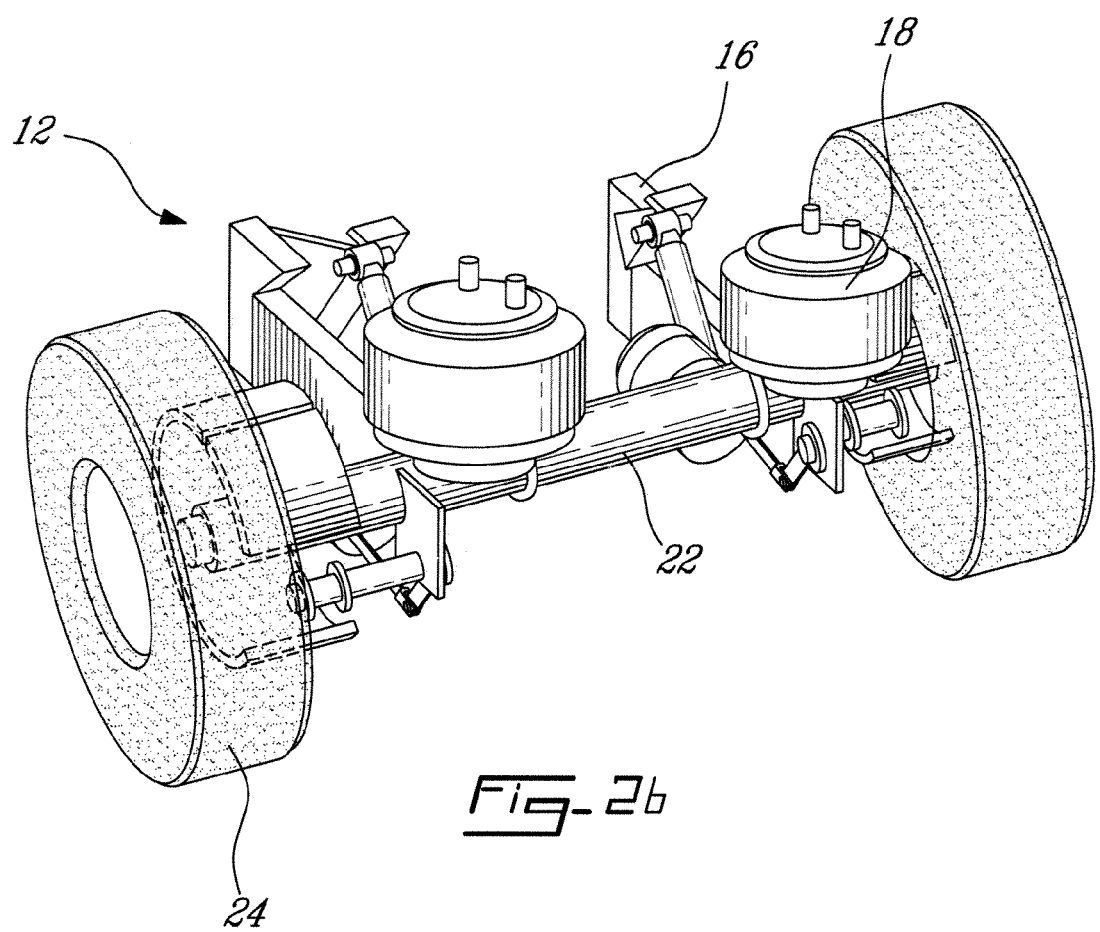
FIG. 2b is a wheel assembly of the trailer in FIG. 1.
Figure 2C:
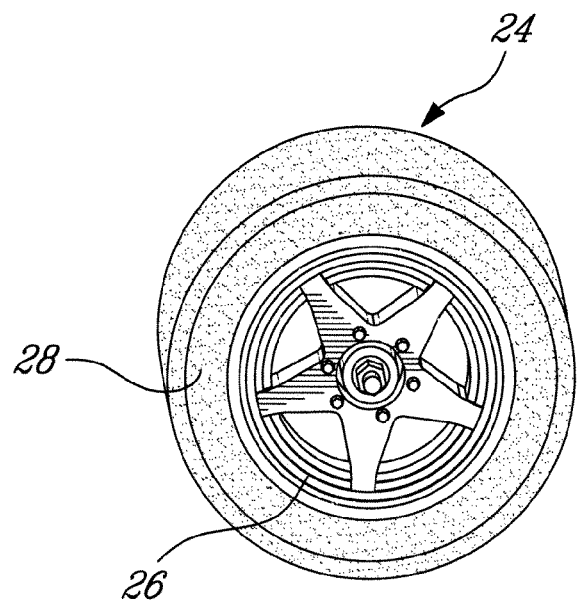
FIG. 2c is a wheel of the wheel assembly in FIG. 2b.

To clarify the terminology used in the present description, as presented in FIG. 2a, the wheel assembly 12 supports the trailer 6. More in detail, as found in FIG. 2b, the wheel assembly 12 is a structure composed of a frame 16 and a suspension 18 to which is attached a wheel axle 22 with wheels 24. Furthermore, as considered in the present description, the wheel 24 is an assembly composed of a rim 26 and a tire 28, as shown in FIG. 2c.

Figure 3:
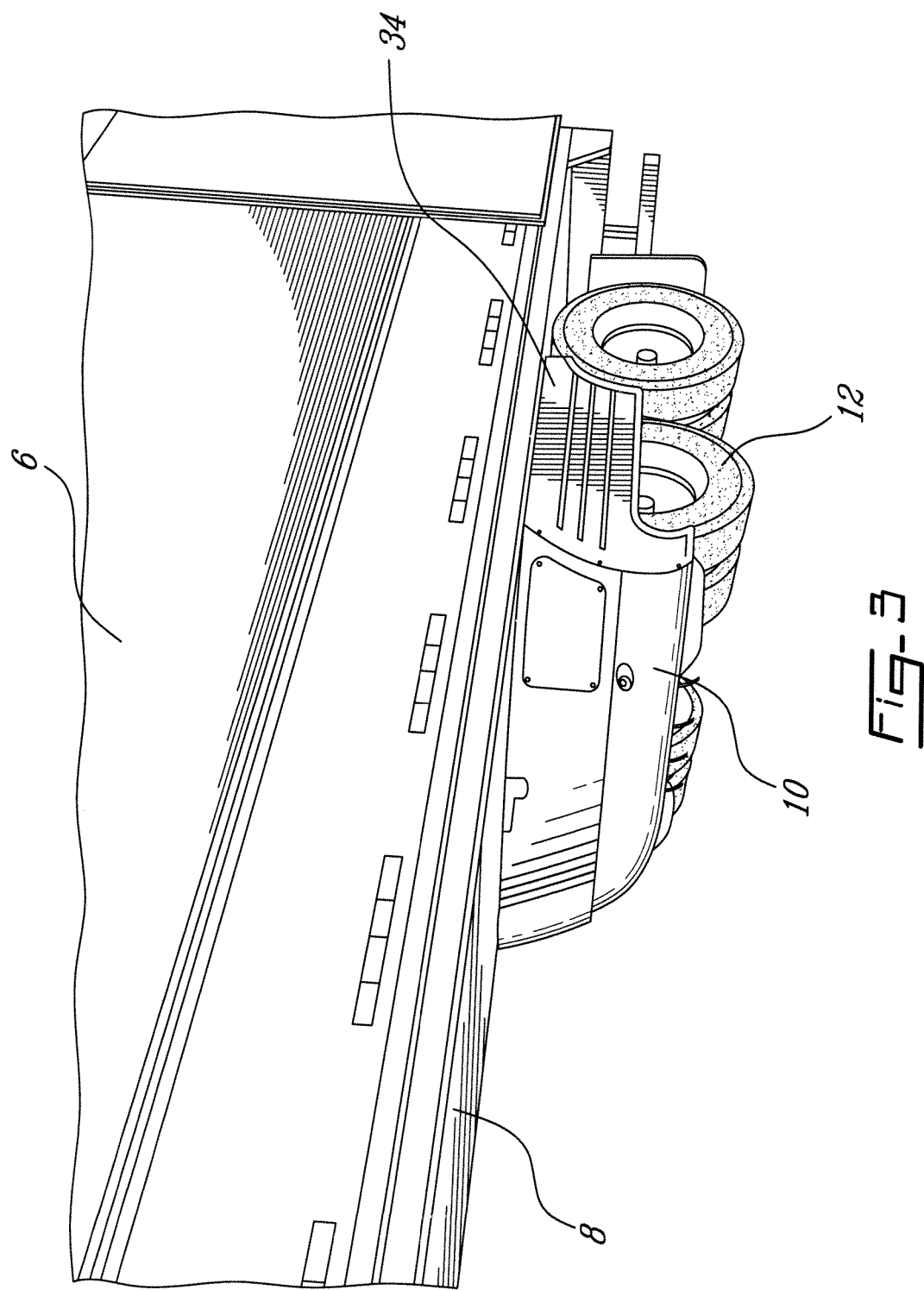
FIG. 3 is a perspective view of the fairing installed on a trailer.

As depicted in FIG. 1 and more accurately in FIG. 3, a fairing 10 is placed in front of the wheel assembly 12 on the underside 8 of the trailer 6. It is important to add that the fairing 10 can be placed at any distance from the wheel assembly 12. The fairing 10 is meant to counteract the effects that the environment has on the trailer 6 or others. The fairing 10 might counteract the effects of the environment in many ways or combination of ways. The following are possible examples of how the fairing 10 could counteract the effects of the environment: First, the fairing 10 can be designed to facilitate the forward movement of the trailer 6. By placing the fairing 10 in front of the wheel assembly 12, the airflow engulfed in the underside 8 of the trailer 6 can be diverted towards the sides of the trailer 6. Secondly, the fairing 10 might serve as a shield, protecting the components of the wheel assembly 12 from the environment. Thirdly, the fairing 10 might prevent side splashes from the wheels 24 to hit nearby overtaking vehicles or any possible bystander. It is to be noted that the fairing 10 can counteract the effects of the environment also in other ways or combination of ways that are not mentioned in the examples above.

Figure 4:
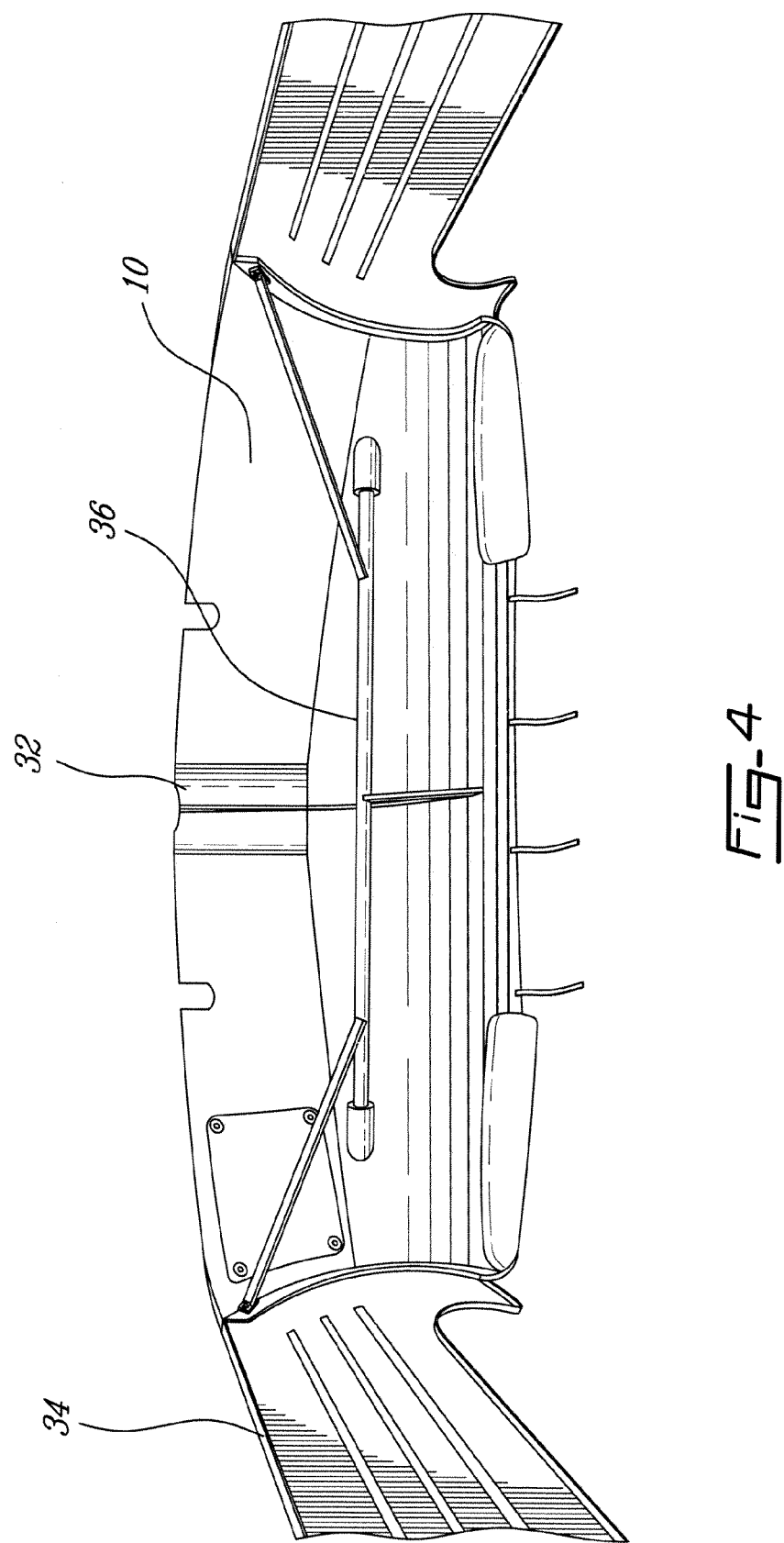
FIG. 4 is back perspective view of the fairing of FIG. 3.

In accordance with an aspect of the invention, presented in FIG. 4, an inside view of the fairing 10 is shown. The fairing 10 is composed of an outer shell 32, two side extensions 34 and a chassis 36. To facilitate the comprehension of how the fairing 10 might function, the components of the fairing will be described. First, the shape of the shell 32, as presented concurrently in FIG. 3, can be designed to influence the diversion path of the airflow or can act as a shield to the wheel assembly 12, consequently protecting it. Second, the side extensions 34 connected to the shell 32, could cover the outer sides of the wheels 24, as presented in FIG. 3. Similarly to the shell 32, the side extensions 34 can guide the airflow along the side of the trailer 6 and prevent splashes from the wheels 24 to hit overtaking vehicles or bystanders. Thirdly, as the shell 32 and the side extensions 34 might be exposed to strong winds and other environmental elements, the shell 32 and side extensions 34 can require additional strengthening. In this embodiment, the chassis 36 provides the additional strengthening. Furthermore, the chassis 36 could also serve as an attachment mean of the fairing 10 to the underside 8 of the trailer 6.

The fairing 10 should not be limited to a literal interpretation of the components described above. The fairing 10 might be composed of a combination of elements or simply of a single element that might or might not be stated in the aspect of the invention. Accordingly, in the case where the fairing 10 is composed of a combination of elements, the fairing 10 might be composed of a subset of the elements stated in this description. Alternatively, the fairing 10 might be composed of a combination of a subset of the elements described in this embodiment with additional elements. Furthermore, the fairing 10 can be composed of a totally different combination of elements then stated in this aspect of the invention.

Figure 5:
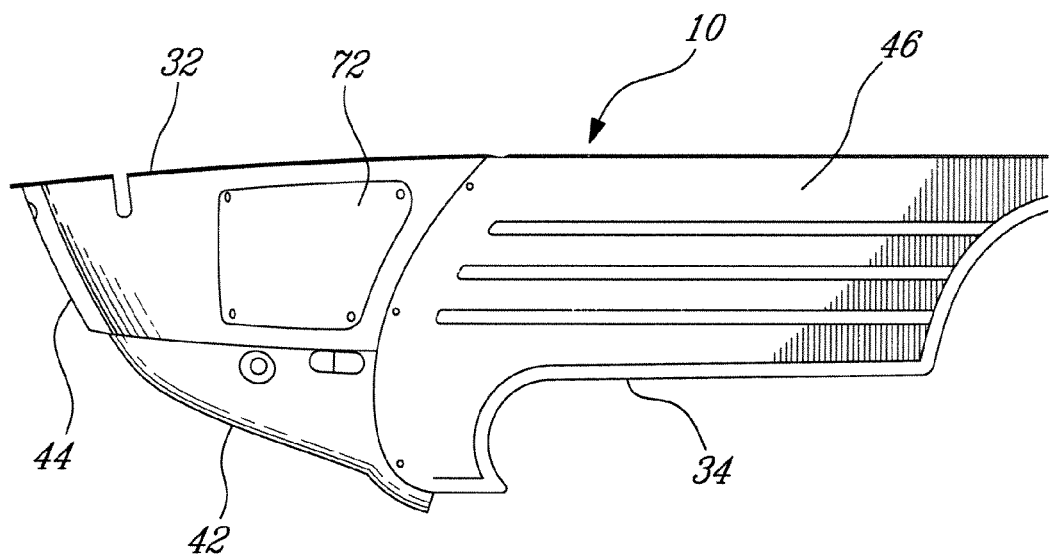
FIG. 5 is a side view of the fairing of FIG. 3.
Figure 6:
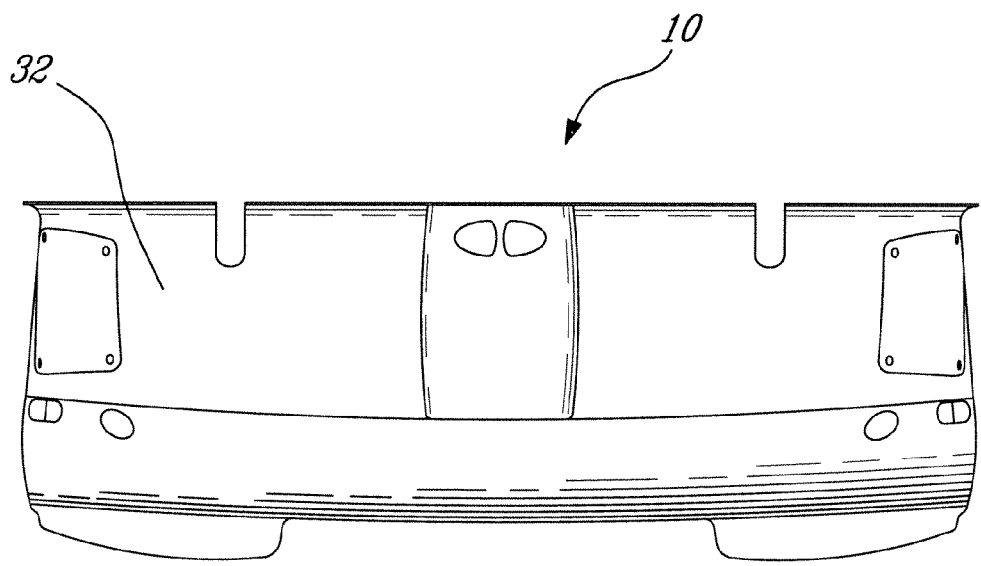
FIG. 6 is a front view of the fairing of FIG. 3.

In this embodiment, when viewed from the outer side, as presented in FIG. 5, a side view of the fairing 10 and FIG. 6, a frontal view of the fairing 10, the fairing 10 displays the shell 32 and side extensions 34. The shell 32 is placed in the frontal part of the fairing 10 as to cover a frontal area of the wheel assembly 12 when the fairing 10 is anchored in place. Accordingly, as presented concurrently in FIG. 3, when the fairing 10 is put into place on the underside 8 of the trailer 6, the shell 32 is positioned in front of the wheel assembly 12 and shaped to divert the airflow and other environmental effects away from the wheel assembly 12 towards the side of the trailer 6. In this embodiment, as the shape of a top portion of a boat bow, the shell 32 has a bottom portion 42 that is set back from a top portion 44. As a result with such a design, the airflow and environmental effects are diverted towards the sides of the trailer 6.

It is to be noticed that the shell 32 might be designed to extend transversely in a single piece or in multiple pieces, along a width of the wheel assembly 12. Consequently, when put in place on the underside 8 of the trailer 6, the shell 32, in a single piece or in multiple pieces, can partially or entirely cover a frontal area of the wheel assembly 12. Furthermore, this invention does not limit the fairing 10 to resemble the top portion of a boat bow, as it can have many other suitable shapes. In addition to the possible multiple suitable shapes, the shell 32 may be fabricated with various materials, such as fiberglass, metal, metalloid, etc. . . . . However, in an aspect of the present invention, the shell 32 is built in fiberglass and the fairing 10 is composed of light, but durable materials only, so as to add very little weight to the trailer 6.

Presented in FIG. 3, in accordance with an aspect of the invention, the side extensions 34 are connected to the outer ends of the shell 32, partially covering the wheels 24 on each side of the trailer 6, when the fairing 10 is put into place. In this embodiment, the side extension 34 is strengthened by the addition of longitudinal ribs 46. Additionally to serving the purpose of guiding the airflow along the side of the trailer 6, the side extensions 34 can also restrict side splashes generated from the wheels 24 when driving through wet or snowy conditions.

It is to be noticed that the side extensions 34 are optional to the invention. However, if side extensions 34 are desired, they can cover partially or entirely the single wheel 24 or multiple wheels 24 of the wheel assembly 12. As shown in FIG. 5, the side extensions 34 can be directly attached to the shell 32, or be a separate piece. Furthermore, the side extensions can be a single or a combination of pieces without necessarily having the same shape as shown in FIG. 5. Additionally, the longitudinal ribs 46 on the side extensions 34 as found in this embodiment can be optional or shaped differently. Alternatively or additionally, the side extensions 34 might be strengthened through a chassis or other means of attachment to the vehicle.

Figure 7:
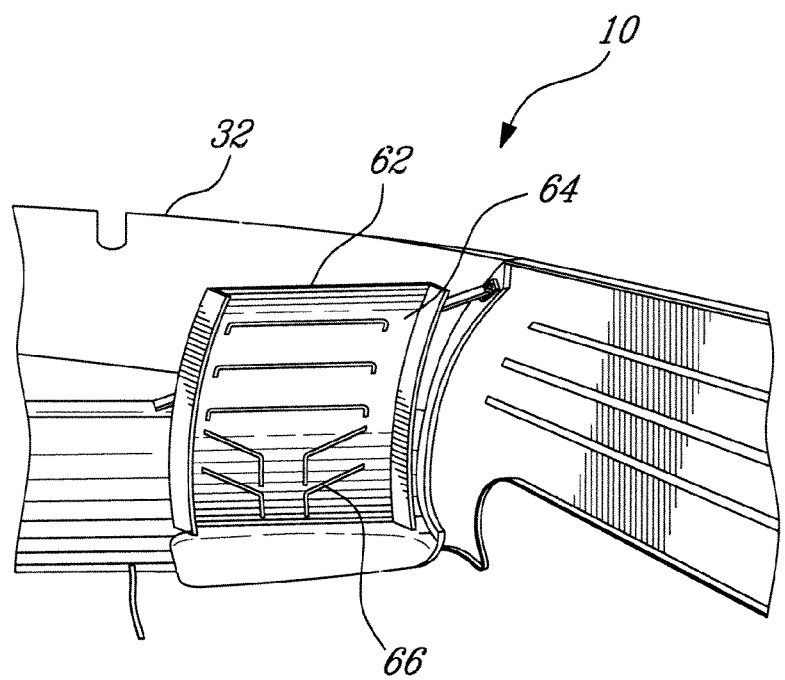
FIG. 7 is a back perspective view of the detail of a fender installed on a fairing, in accordance with an embodiment of the invention.

In this embodiment, to avoid the accumulation of liquids or solids, such as water or snow collected from the wheels and dropped into the shell 32, as illustrated in FIG. 7, fenders 62 are added to the shell 32. The fenders 62 are placed in an inner side at both ends of the shell 32, perpendicularly to the side extensions 34. Consequently, the fenders 62 are positioned to partially cover a thread surface of the wheels 20, when the fairing is placed into position in front of the wheel assembly 12. Furthermore, the fenders 62 are equipped with transversal cascading ripples 64 at their upper portion and water channeling embossment 66 angled downwardly towards the center of the fenders 62 at their lower portion.

It is to be noticed that the fenders 62 are optional. There may simply be no means of avoiding the accumulation of liquids or solids in the fairing 10. Alternatively, other means of avoiding the accumulation of liquids or solids in the shell might be used. For example, the shell might have a small or large opening in the bottom preventing liquids or solids to accumulate. However if present, the fenders 62 might be shaped differently. The fender could cover entirely or partially, the full width of the fairing 10 rather than only the surface of the wheels. Furthermore if present, the fenders 62 can be attached differently, for example, they could be attached to the underside 8 of the trailer 6. It is to be noted that the ripples and embossments allowing water channeling on the fenders 62 are also optional and can have different shapes.

As the fairing 10 is placed right in front of the wheel assembly 12, for maintenance purposes, the access to the components of the wheel assembly 12 can be difficult. In this embodiment, as illustrated in FIGS. 5 and 8, the shell 32, in its top portion 44, may be further equipped with an access door 72 giving access to the components of the wheel assembly 12.

Notice that the maintenance door 72 is optional. The fairing 10 might simply not have any means of accessing the wheel assembly 12. Furthermore, the presence of the door 72 in the fairing can be for any other reason then for the maintenance of the wheel assembly 12. For example, it might be present to access other parts of the underside 8 of the trailer 6 or to access the inside of the fairing 10. Alternatively, if present, the maintenance door 72 might be shaped or placed differently at single or multiple locations.

Figure 8:
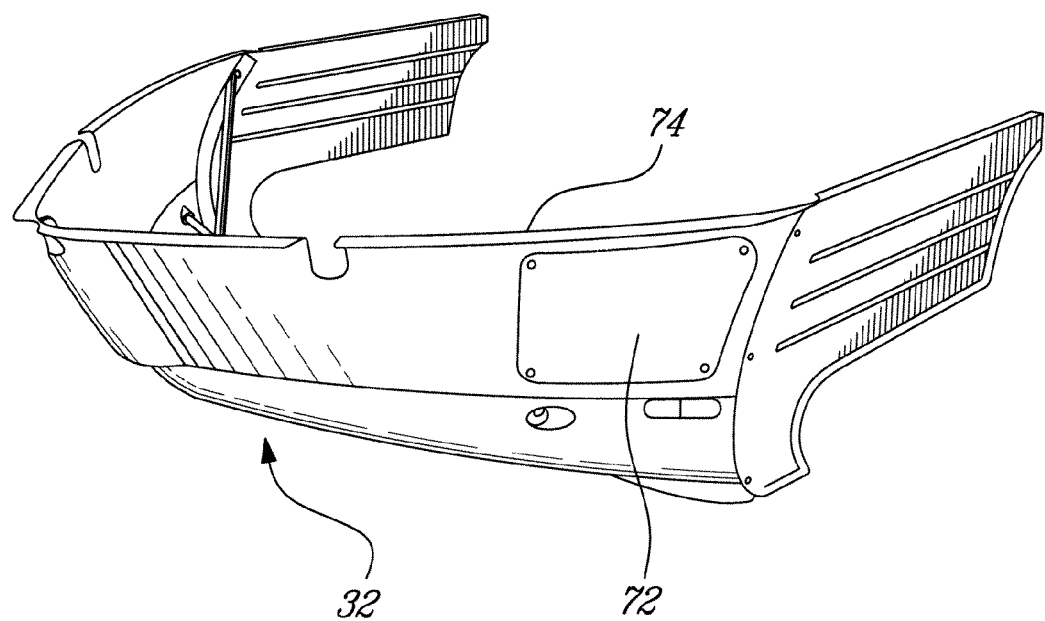
FIG. 8 is a perspective view of the fairing in accordance with an embodiment of the invention.
Figure 9:
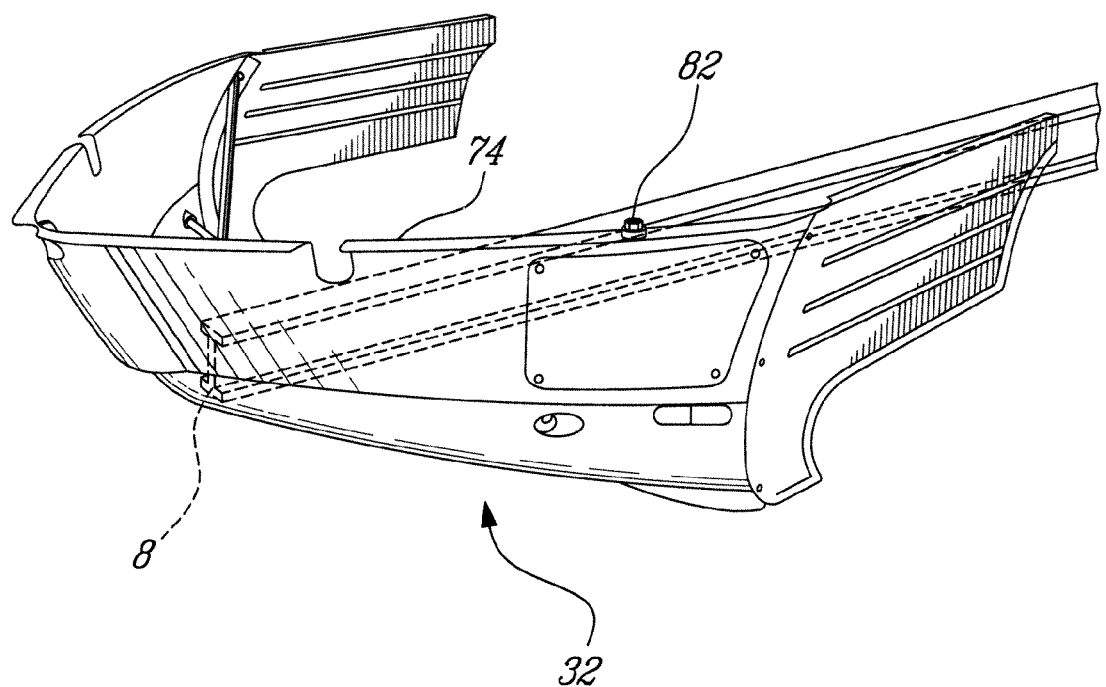
FIG. 9 is a perspective view of the installation of an anchoring mechanism for attaching a fairing to the underside of a trailer in accordance with an embodiment of the invention.

Furthermore, again illustrated in FIG. 8, the shell 32 also has a top edge 74 matching the underside 8 of the trailer 6. As shown in FIG. 9, the top edge 74 of the shell 32 allows anchoring the fairing 10 into place on the underside 8 of the trailer 6 thanks to an anchoring mechanism 82. The anchoring mechanism 82 can consist of a bolt and nut system or of any other means of attaching the top edge 74 of the shell 32 to the underside 8 of the trailer 6.

Notice that the shape of the top edge 74 might be optional or different. The top edge 74, if present might not necessarily match the underside 8 of the trailer 6. For example, the fairing 10 might be shaped in such a way as to cover only the bottom portion of the wheel assembly and might not require matching the underside 8 of the trailer 6. Furthermore, the top edge 74, if present, might not be used to anchor the fairing 10 to the trailer 6. As there are numerous ways that can be thought for anchoring the fairing 10 to the underside 8 or other parts of the trailer 6, the following are to be considered as possibilities but must not be limited to the following alternatives.

Figure 10:
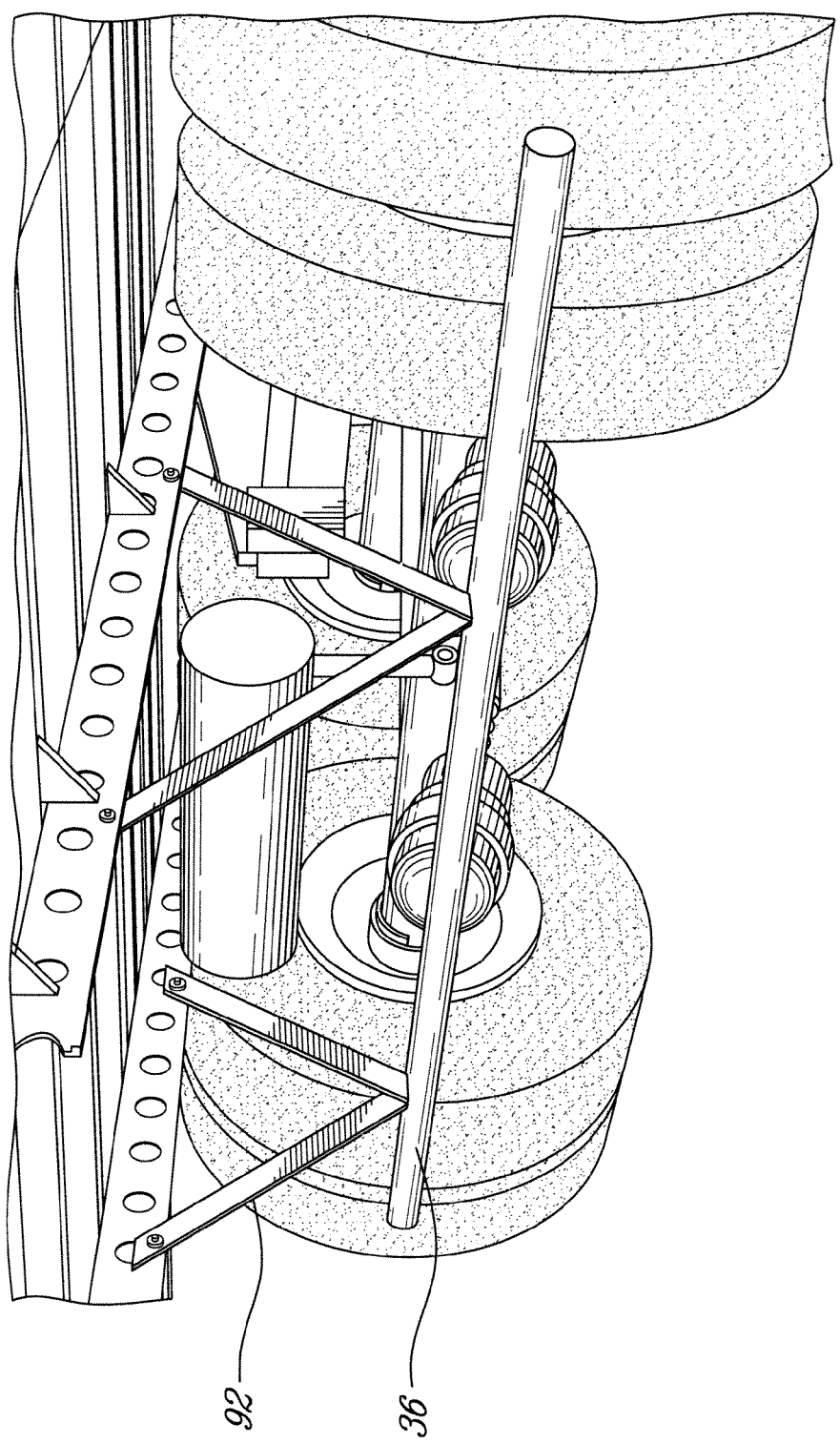
FIG. 10 is a perspective view of the installation of an anchoring mechanism for attaching a fairing to the underside of a trailer in accordance with an embodiment of the invention.

One alternative is to use the chassis 36 as an attachment means to the underside 8 of the trailer 6. As presented in FIG. 10, an anchoring mechanism 92 consists of connecting the chassis 36 to the underside 8 of the trailer 6 with connecting rods or any other means of connection.

Figure 11:
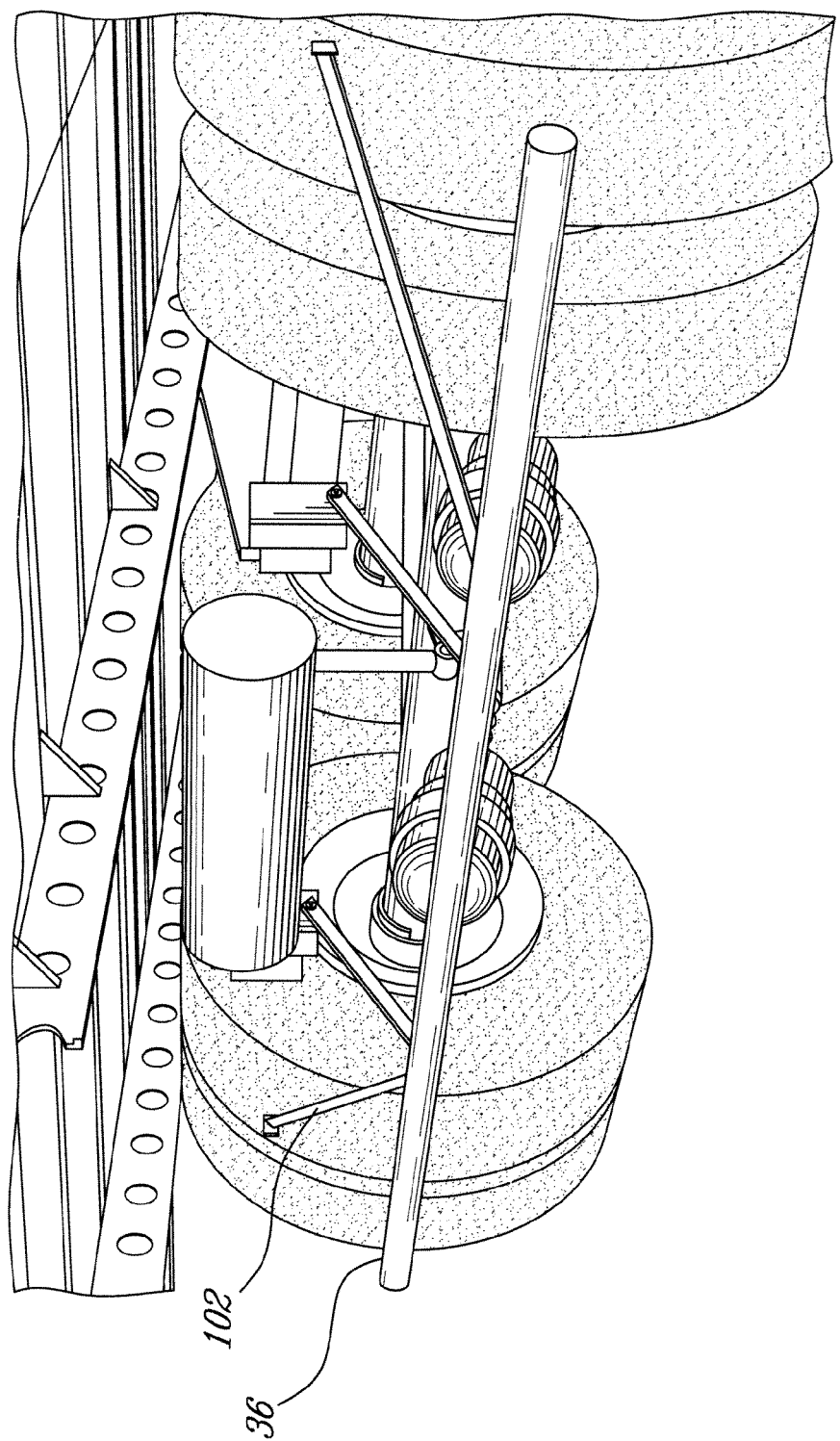
FIG. 11 is a perspective view of the installation of an anchoring mechanism for attaching a fairing on a wheel assembly frame in accordance with an embodiment of the invention.

Another alternative way of connecting the fairing 10 to the underside 8 of the trailer 6, as presented in FIG. 11, is to connect the chassis 36 to the wheel assembly 12 rather than directly to the underside 8 of the trailer 6, with the means of connecting rods 102 or any other means of connection. This alternative might be appreciated, when the wheel assembly 12 must often be moved, in order to adjust to the weight of the goods to be transported.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description.

I claim:

1. A fairing for a trailer having a frame and a movable wheel assembly, the wheel assembly having wheels attached to a structure, the structure being movable along the frame of the trailer, the wheel assembly defining a width and a frontal area, the fairing comprising:
   a shell covering substantially the frontal area of the wheel assembly and extending transversely substantially the width of the wheel assembly, said shell having a bottom portion and a top portion, said bottom portion being set back from said top portion;
   an anchoring mechanism for attaching said shell to the structure of the wheel assembly whereby allowing free movement of the shell together with the wheel assembly along the frame of the trailer; and
   a chassis for strengthening said shell, said chassis comprising a width adjustment mechanism for adjusting the width of said shell.

2. A fairing for a trailer having a frame and a movable wheel assembly, the wheel assembly having wheels attached to a structure, the structure being movable along the frame of the trailer, the wheel assembly defining a width and a frontal area, the fairing comprising:
   a shell covering substantially the frontal area of the wheel assembly and extending transversely substantially the width of the wheel assembly, said shell having a bottom portion and a top portion, said bottom portion being set back from said top portion;
   an anchoring mechanism for attaching said shell to the structure of the wheel assembly whereby allowing free movement of the shell together with the wheel assembly along the frame of the trailer; and
   fenders attached to said shell, said fenders being adapted to partially cover a tread surface of wheels of the wheel set, said fenders being equipped with transversal cascading ripples at the upper portion, and with water channeling embossments angled downwardly towards a center of said fenders.

3. The fairing of claim 1 or 2 wherein said shell comprises side extensions extending along sides of the trailer, said side extensions at least partially covering the sides of the wheel set of the wheel assembly.

4. The fairing of claim 3 wherein said side extensions at least partially clear a central area of wheels of the wheel set.

5. The fairing of claim 4 wherein said side extensions have longitudinal ribs.

6. The fairing of claim 1 or 2 further comprising a chassis for strengthening said shell and said side extensions.

7. The fairing of claim 1 or 2 wherein said shell is equipped with an access door for accessing the wheel assembly.

8. The fairing of claim 1 or 2 wherein said shell has a top edge matching an underside of the trailer.

9. The fairing of claim 1 or 2 wherein said shell is shaped similarly to a top portion of a boat bow.

10. The fairing of claim 1 or 2 further comprising a chassis for strengthening said shell, said anchoring mechanism being attached to said shell through said chassis.

* * * * *